United States Patent
Choi et al.

(10) Patent No.: US 9,436,522 B2
(45) Date of Patent: Sep. 6, 2016

(54) MULTIMEDIA DATA PROCESSING METHOD

(75) Inventors: Byeong Ho Choi, Yongin-si (KR);
Yong Hwan Kim, Anyang-si (KR);
Hwa Seon Shin, Seongnam-si (KR);
Choong Sang Cho, Seongnam-si (KR);
Min Seok Park, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 736 days.

(21) Appl. No.: 13/521,819

(22) PCT Filed: Dec. 24, 2010

(86) PCT No.: PCT/KR2010/009309
§ 371 (c)(1),
(2), (4) Date: Jul. 12, 2012

(87) PCT Pub. No.: WO2011/087220
PCT Pub. Date: Jul. 21, 2011

(65) Prior Publication Data
US 2012/0291052 A1 Nov. 15, 2012

(30) Foreign Application Priority Data
Jan. 12, 2010 (KR) .................. 10-2010-0002526

(51) Int. Cl.
*G06F 3/00* (2006.01)
*G06F 9/54* (2006.01)

(52) U.S. Cl.
CPC .......... *G06F 9/54* (2013.01); *G06F 2209/542* (2013.01)

(58) Field of Classification Search
None
See application file for complete search history.

(56) References Cited

U.S. PATENT DOCUMENTS

| 7,996,488 B1 * | 8/2011 | Casabella et al. ............ 709/217 |
| 8,539,128 B1 * | 9/2013 | Bangfei .................. G06F 13/42 345/473 |
| 2008/0010392 A1 | 1/2008 | Melpignano |
| 2008/0134012 A1 | 6/2008 | Kokes et al. |
| 2009/0083448 A1 | 3/2009 | Craine et al. |
| 2009/0164655 A1 | 6/2009 | Pettersson et al. |
| 2009/0307772 A1 | 12/2009 | Markham et al. |

OTHER PUBLICATIONS

Vassilakis et al.,"Web Service Execution Streamlining," IEEE, Oct. 2006, 6 pages.*
International Searching Authority, International Search Report for PCT/KR2010/009309 dated Aug. 23, 2011.

* cited by examiner

*Primary Examiner* — H S Sough
*Assistant Examiner* — Carina Yun
(74) *Attorney, Agent, or Firm* — Sughrue Mion, PLLC

(57) ABSTRACT

Disclosed is a multimedia data processing method by a framework, in which the framework is capable of directly controlling data input and output of components in a state of the framework being interposed between the components and an application program, thereby reducing the time and effort involved in developing the components or the application program.

8 Claims, 5 Drawing Sheets

- Conventional Art -

- Conventional Art -

MULTIMEDIA DATA PROCESSING METHOD

CROSS REFERENCE TO RELATED APPLICATIONS

This application is a National Stage of International Application No. PCT/KR2010/009309 filed Dec. 24, 2010, claiming priority based on Korean Patent Application No. 10-2010-0002526 filed Jan. 12, 2010, the contents of all of which are incorporated herein by reference in their entirety.

TECHNICAL FIELD

The present invention relates to a method of processing multimedia data, and more particularly to a method of processing multimedia data by a framework which enables the framework to directly control a data input/output of a component in a state where the framework is interposed between the component and an application program.

BACKGROUND ART

As many people know, it is required to construct a media graph in order to process data including solely a sound or a video (image) or a multimedia (hereinafter, simply referred to as a "media") including a combination of the sound and the video, for example, to reproduce, store, or transmit a media file, receive a DMB (Digital Multimedia Broadcasting), support a video conference and the like (hereinafter, such a media processing work is generally referred to as "rendering"). Here, the "media graph" refers to a set of one or more components added or connected to process a media data stream, and the "component" refers to a computer program for processing the media data stream and the component can independently perform a function. Each component can selectively have one or more of an input port and an output port.

FIG. 1 is a diagram for describing a multimedia data processing structure according to a conventional example. As shown in FIG. 1, in the multimedia data processing structure according to the conventional example, an Application Program (APP) 10 is located in a top layer, a media graph including one or more components 30 is located in a bottom layer, and a media framework 20 corresponding to a base environment supporting a construction of the media graph and rendering, for example, a media framework (hereinafter, simply referred to as a "framework") such as DirectShow, GStreamer and the like is located between the application program 10 and the components 30.

According to the above description, the conventional framework 20 performs functions of controlling the component 30 for reproducing a media, receiving an event from the component 30, and transferring the received event to the application program 10 as necessary. Further, the application program 10 also transfers commands such as a reproduction of and a search for a media data stream to the framework 20 as necessary, and the framework 20 having received such a command transfers the command to the component 30 and thus a user's demand is reflected. That is, the conventional media data processing structure includes a three-story structure including the application program 10, the component 30, and the framework 20 interposed between the application program 10 and the component 30. Media data, for example, media stream data or decoded media data is directly transferred from one component 30 to another component 30 without having to go through the framework 20 in order to prevent the capability deterioration generated due to a large amount of data.

However, according to the conventional media data processing structure as described above, since the framework 20 cannot access the media data transferred between the components 30, it is difficult to identify operations of the components 30 when the components 30 or the application program 10 are developed, and accordingly it takes a lot of time and effort to solve the problem generated when the components or the application program are developed.

In consideration of the above problem, a media data processing structure, in which an upper layer relays data between lower components, that is, the upper layer receives the data from the lower component and then outputs the data to the corresponding component or a following component, is proposed under the name of "OpenMax" (more precisely "OpenMax IL (Integration Layer), hereinafter, referred to as "OpenMax) by Khronos Group and is becoming an industrial standard. FIG. 2 is a diagram for describing the multimedia data processing structure according to such an OpenMax. The OpenMax corresponds to a standard for components and communication between the components, and defines an operation which the component should perform, an interface and the like, for example, defines a format setting in a media graph construction, a data transmission/reception interface setting, an attribute setting, a connection component setting, and a setting of inherent characteristics of the component.

The data processing structure as shown in FIG. 2 corresponds to a two-story structure in which an application program (referred to as a "client" in the OpenMax) 40 is located in a top layer, and one or more components 50 included in the media graph are located in a bottom layer, and is largely operated in two operation modes, that is, a direct communication mode (referred to as a "tunneling mode" in the OpenMax) in which data is directly transmit between the components 50 and an indirect communication mode (referred to as a "non-tunneling mode in the OpenMax) in which the data is transmitted between the components 50 via an application program 40.

In an example of FIG. 2, while a first component and a second component are operated in the tunneling mode and thus data is directly transmitted between the two components, the second component and a third component are operated in the non-tunneling mode and thus the data is transmitted between the two components via the application program 40. Accordingly, in the example of FIG. 2, the second component transmits the data by calling the application program 40, and the application program 40 transmits the data by calling the third component.

However, according to the conventional data processing structure as described above, for example when there are six components included in the media graph, a function is made after twelve handlers are individually defined for input ports and output ports, so that substantially much time and effort are required for developing the components or the application program.

DISCLOSURE

Technical Problem

The present invention has been made to solve the above-mentioned problem, and an aspect of the present invention is to provide a method of processing multimedia data by a framework, in which the framework interposed between a component and an application program can directly control a data input/output so that time and effort spent on developing the components or the application program can be reduced.

Technical Solution

In accordance with an aspect of the present invention, there is provided a method of processing multimedia data including the steps of: (a) inquiring about a supportable communication mode of a component, by a multimedia framework between an application program and one or more components basically supporting an indirect communication mode in which the multimedia framework controls a data input/output and selectively supporting a direct communication mode in which the multimedia framework does not control the data input/output; and (b) when the component supports the direct communication mode as a result of the inquiry, constructing a media graph by selectively using the indirect communication mode or the direct communication mode.

In the above description, when there is a request for data transmission from the application program although the component supports the direct communication mode in step (b), the media graph is constructed using the indirect communication mode.

Meanwhile, when the indirect communication mode is used in step (b), a handler which can process data of the component is generated and registered.

In contrast, when a construction of the media graph using the indirect communication mode is failed in step (b), the failure is notified to the application program and then the media graph is constructed using the direct communication mode.

Advantageous Effects

According to a method of processing multimedia data of the present invention, a framework interposed between a component and an application program can directly control a data input/output, and thus time and effort spent on developing the component or the application program can be reduced. Also, the capability of the application program can be further reinforced since the application program can directly control the component as necessary.

For example, according to the framework of the present invention, an event and data of the component is transmitted to the application program through the framework, so that a developer can directly identify all signals generated in the component and can identify an operation of the component for each step. Further, in the development of an encoding and decoding component, the application can directly output and identify input/output data of a corresponding single component unlike the conventional framework, and accordingly it can be easily and quickly identified whether an encoding/decoding operation of the component is normally performed.

BEST MODE

Mode for Invention

Hereinafter, exemplary embodiments of the present invention will be described with reference to the accompanying drawings.

Figure 1:
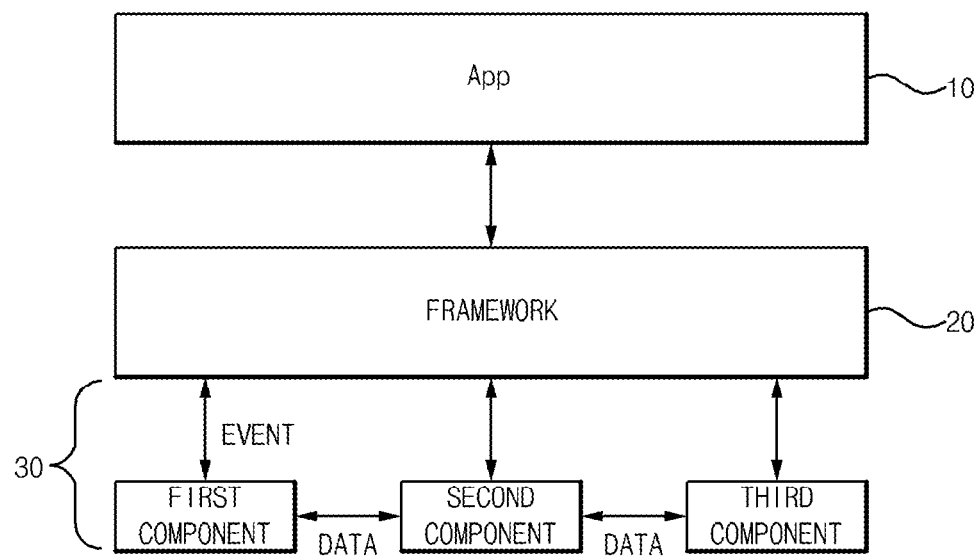
FIG. 1 is a diagram for describing a multimedia data processing structure according to a conventional example.
Figure 2:
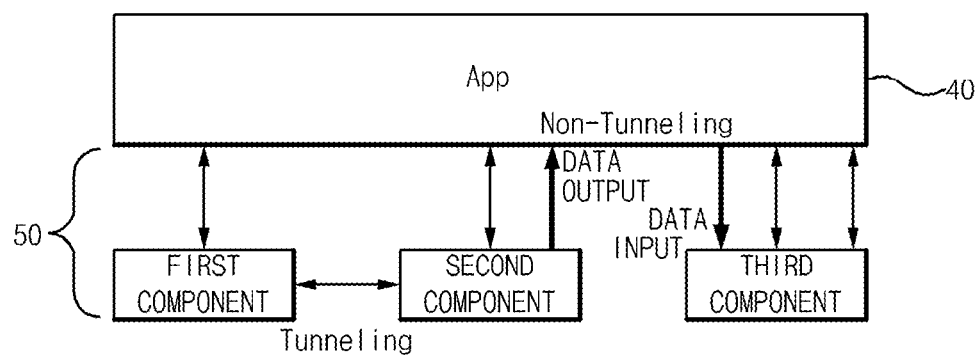
FIG. 2 is a diagram for describing a multimedia data processing structure according to another conventional example.
Figure 3:
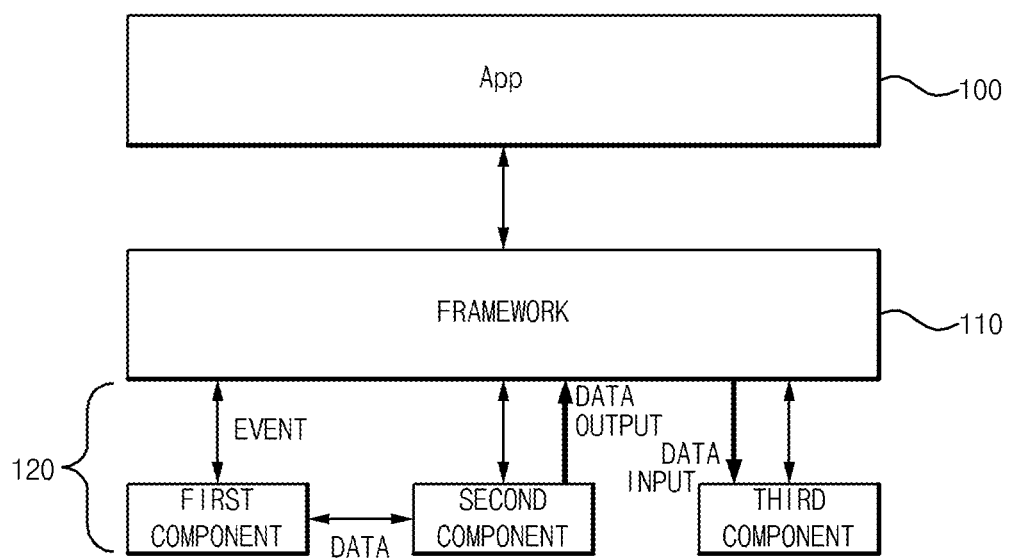
FIG. 3 is a diagram for describing a multimedia data processing structure according to the present invention.

FIG. 3 is a diagram for describing a multimedia data processing structure according to the present invention. As shown in FIG. 3, in the multimedia data processing structure according to the present invention, an Application Program (APP) 100 is located in a top layer, a media graph including one or more components 120 is located in a bottom layer, and a framework 110 corresponding to a base environment supporting a construction of the media graph and rendering is located between the application program 110 and the components 120 similarly with the structure in FIG. 1. However, unlike the structure in FIG. 1, the framework 110 has a function for simultaneously supporting the direct communication mode and the indirect communication mode, that is, the framework 110 has a function for supporting the indirect communication mode in which the framework 110 receives data from the component 120 and then transmits the received data to another component 120 or the application program 100 in data transmission.

Of course, the framework 110 according to the present invention also performs a function of receiving an event from the component to reproduce a media data stream and transmitting the received event to the application program 100 as necessary. The application program 100 also can transmit commands such as a reproduction of and a search for a media data stream to the framework 110 as necessary, and the framework 110 having received the command transmits the command to the component 120 so that a user's demand is reflected.

In an example of FIG. 3, data is directly transmitted between a first component and a second component without going through the framework 110, but data is transmitted via the framework 110 between the second component and a third component, that is, the second component transmits the data to the framework 110 and the framework 110 transmits the data to the third component. Further, in this process, the framework 110 transmits the data transmitted from the component 120 to the application program 100 according to a request of the application program 100, and then receives back the data from the application program 100 and transmits the data to the corresponding component 120 or the following component 120. Here, the application program 100 identifies and transmits back the received data to the framework 110 without any modification, or can directly modify the data. In a case where the application program 100 directly modifies the data, the framework 110 can play a role of transmitting the data transmitted from the application program 100 to the component 120 without any modification.

With respect to a more detailed function of the framework 110 according to the present invention, the framework 110 performs a function of automatically recognizing a communication mode supported by each component 120 in a process of constructing the media graph and automatically registering a handler for constructing the media graph. Next, in the operation process of the media graph, the framework 110 performs a function of relaying data between the component 120 and the application program 100 or processing an error when the indirect communication mode is used.

Here, each component 120 basically supports the indirect communication mode but selectively supports the direct communication mode. The framework 110 inquires about a supportable communication mode of the component 120. Then the framework 110 allows the component 120 to operate with the direct communication mode when there is no data transmission request from the application program 100, and allows the component 120 to operate in the indirect communication mode although the corresponding component 120 supports the direct communication mode when there is the data transmission request from the application program 100, so that the data is transmitted to the application program 100 after the framework 120 receives the data from the component 120.

Figure 4:
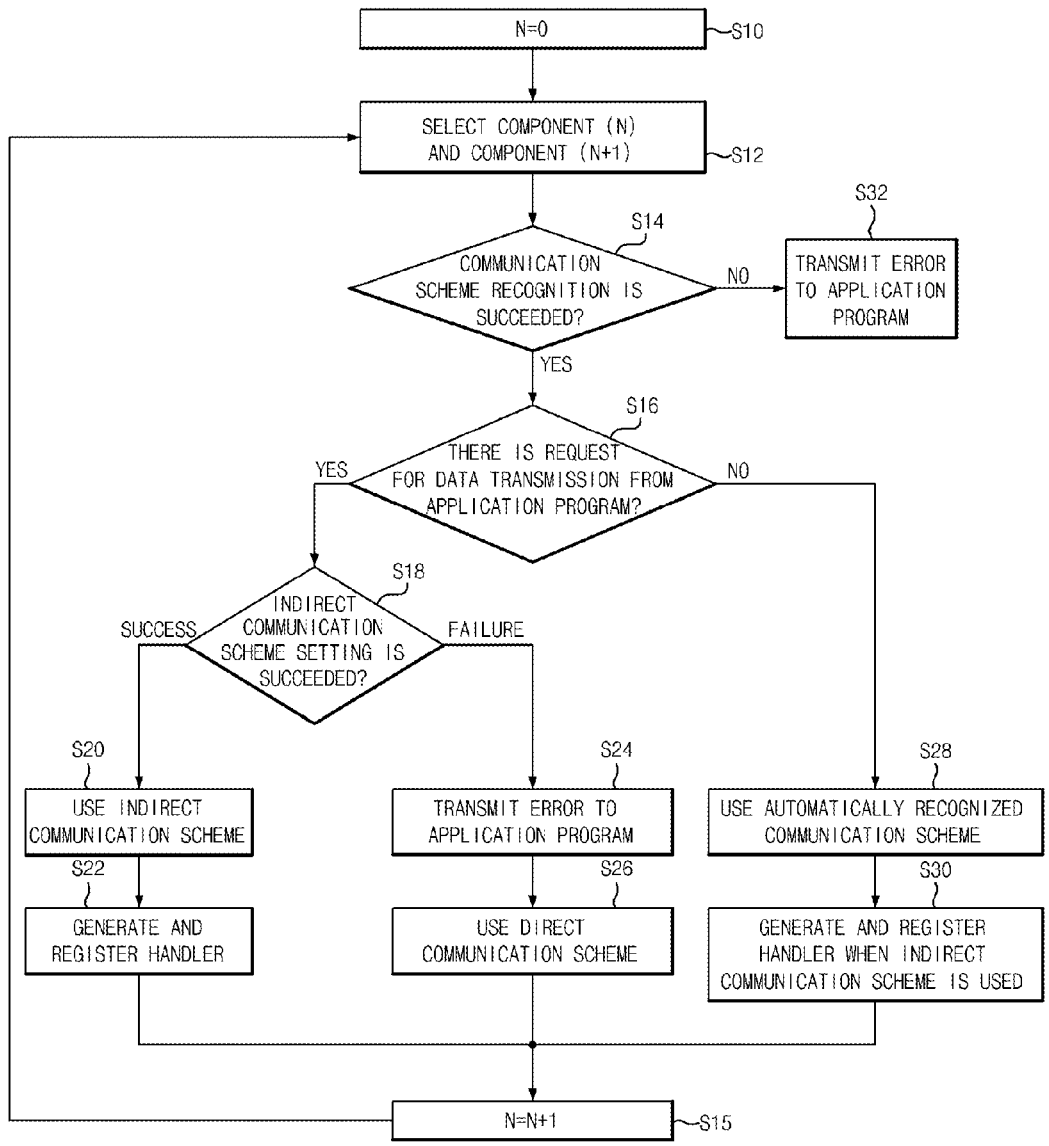
FIG. 4 is a flowchart for describing a process of constructing a media graph in a method of processing multimedia data according to the present invention.

FIG. 4 is a flowchart for describing a process of constructing a media graph in a method of processing multimedia data according to the present invention, and a subject of steps in the flowchart is the framework 110. As shown in FIG. 4, in steps S10 to S14, a communication mode which can be supported by each of components (N and N+1) included in the media graph is inquired, that is, it is inquired whether the direct communication scheme is supported, and it is determined whether a communication (transmission) scheme for each component can be recognized. When the recognition is failed, step S32 is performed and an error generation is transmitted to the application program 100.

Meanwhile, when the recognition of the communication mode is succeeded as a result of the determination in step S14, step S16 is performed and it is determined whether there is a data transmission request from the application program 100. When there is no data transmission request from the application program 100 as a result of the determination in step S16, step S28 is performed and the media graph is constructed using the automatically recognized communication mode. At this time, when the direct communication mode is used, the data is directly transmitted between the components 120 without taking any action. When the indirect communication mode is used, step S30 is performed and a handler for processing a flow of the data is generated and registered. Here, as described above, when there is no data transmission request from the application program 100 in a state where it is recognized that the corresponding component 120 supports both the direct communication mode and the indirect communication mode, the framework 110 constructs the media graph by using the direct communication mode in order to more rapidly process the data.

Referring back to FIG. 4, when there is the data transmission request from the application program 100 as the result of the determination in step S16, step S18 is performed and it is determined whether a setting of the indirect communication mode is succeeded. When the setting of the indirect communication mode is succeeded as the result of the determination in step S18, steps S20 and S22 are performed, and a handler required for constructing the media graph is generated and registered while the media graph is constructed using the indirect communication mode.

When the setting of the indirect communication mode is failed as the result of the determination in step S18, step S24 is performed and an error is transferred to the application program 100, and then the media graph is constructed using the direct communication mode. The processes described above are repeated until the construction of the media graph is completed.

Figure 5:
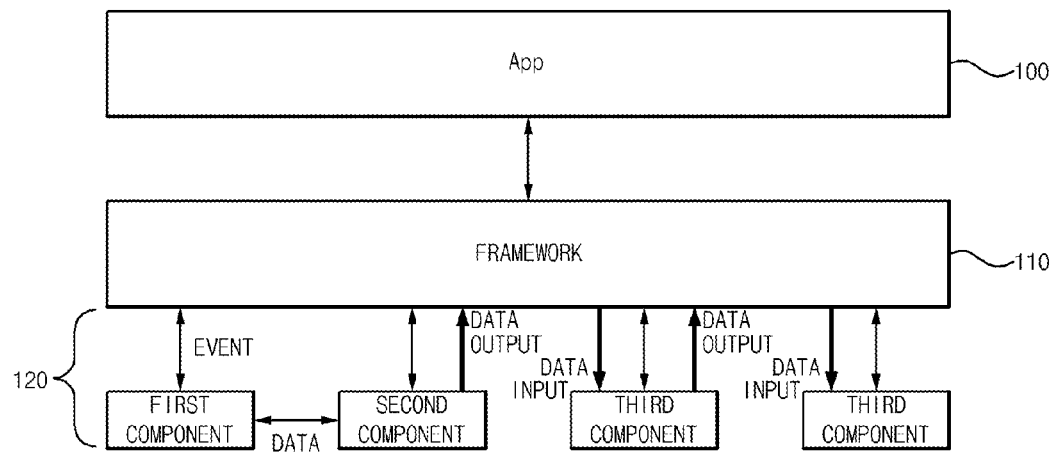
FIG. 5 is a diagram for describing an example in which a media graph is constructed by combining a direct communication mode and an indirect communication mode in the method of processing multimedia data according to the present invention.

FIG. 5 is a diagram for describing an example in which a media graph is constructed by combining a direct communication mode and an indirect communication mode in the method of processing multimedia data according to the present invention. As shown in FIG. 5, the framework 110 according to the present invention can connect some components 120 within the media graph with the direct communication mode as necessary, or construct the media graph by using a combined communication mode in which some components 120 are connected using the indirect communication mode. That is, when data to be input/output to the particular component 120 is needed, the indirect communication mode may be used. When the data is not needed, the direct communication mode may be used. Further, in connection with a third component in FIG. 5, the framework 110 transmits data to one component 120 and then can receive back the data processed in the corresponding component 120.

Figure 6:
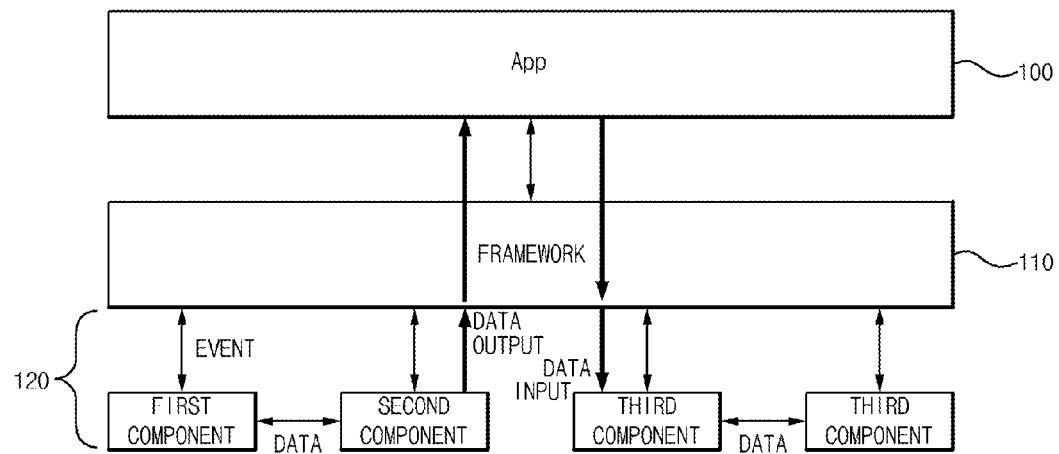
FIG. 6 is a diagram for describing an example of an operation which can be performed through the indirect communication mode in the method of processing multimedia data according to the present invention.

FIG. 6 is a diagram for describing an example of an operation which can be performed through the indirect communication mode in the method of processing multimedia data according to the present invention. As shown in FIG. 6, when the application program 100 requires data transmitted between a second component and a third component, for example, when a component developer or an application program developer requires the data for the debugging, the application program 100 makes a request for transmitting the data from the framework 110. Then, the framework 110 identifies whether the second component and the third component can be connected using the indirect communication mode. When the two components can be connected using the indirect communication mode, they are connected using the indirect communication mode. When the two components cannot be connected using the indirect communication mode, the framework 100 notifies of it as an error.

Figure 7:
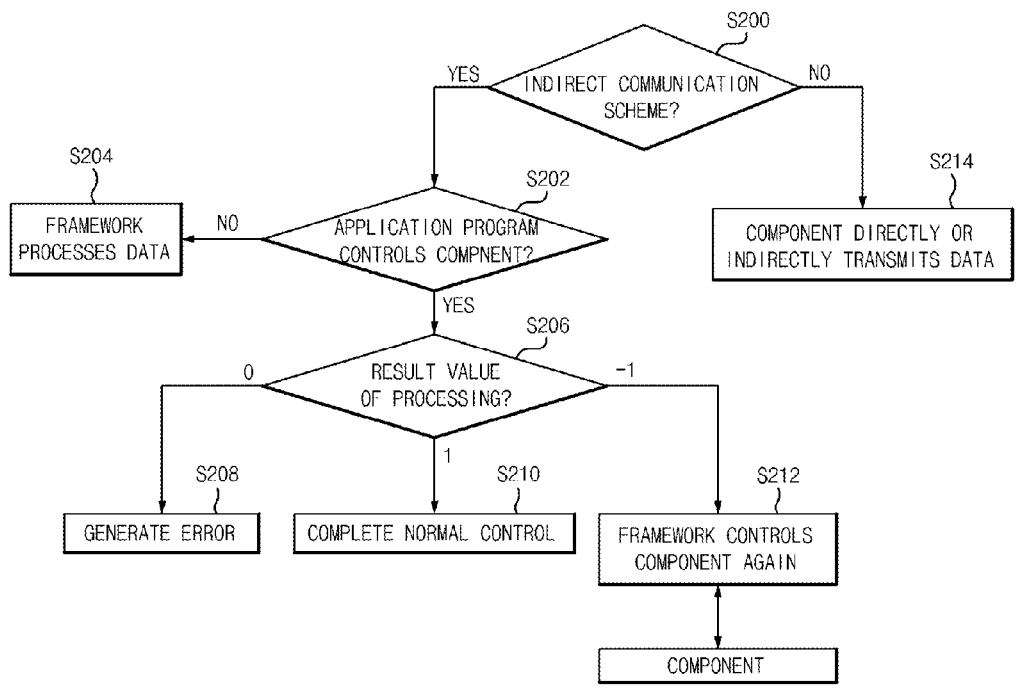
FIG. 7 is a flowchart for describing an operation process of the media graph in the method of processing multimedia data according to the present invention.

FIG. 7 is a flowchart for describing an operation process of the media graph in the method of processing multimedia data according to the present invention, and steps in the flowchart are performed by the media graph. As shown in FIG. 7, the component 120 checks whether the media graph is constructed such that the indirect communication mode can be used in step S200. When the media graph is constructed such that the direct communication mode is used, step S214 is performed and data is directly transmitted between the components 120. When the media graph is constructed such that the indirect communication mode is used, step S202 is performed and it is determined whether the application program 100 controls the component 120, that is, it is determined whether the application program 100 makes a request for data transmission. When the application program 100 does not make the request for the data transmission, step S204 is performed and the framework 110 transmits the data received from the corresponding component 120 to the corresponding component, for example, the same component or a following component without any modification, or transmits the data with any processing or modification.

When the application program 100 makes the request for the data transmission as a result of the determination in step S202, the framework 110 receives the data from the corresponding component 120 and then transmits the data to the application program 100 without any processing. Thereafter, the application program 100 processes required data and then transmits a result value of the processing to the framework 110. In this embodiment, three result values of the processing are described as an example. For example, when a result value of the processing by the application program 100 is "0", it means that an error is generated although the application program 100 processes the data. When the result value of the processing is "1", it means that a normal control is completed. In this case, the framework 110 performs no operation for the component 120. Finally, when the result value of the processing is "−1", it means that the application program 100 has performed no operation for the component 120, so the framework 110 controls the component 120 again.

Figure 8:
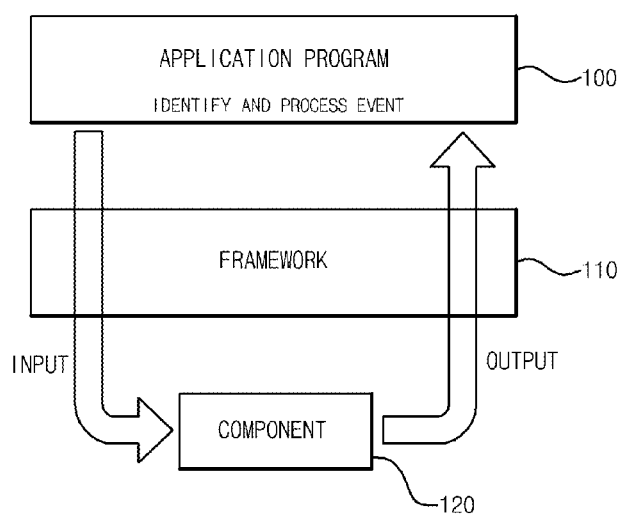
FIG. 8 is a diagram for describing a data processing structure for one component in the method of processing multimedia data according to the present invention.

FIG. 8 is a diagram for describing a data processing structure for one component in the method of processing multimedia data according to the present invention. As shown in FIG. 8, according to the method of processing the multimedia data based on the present invention, the framework 110 can perform the following functions in the indirect communication mode. For example, when the framework 110 sets such that the indirect communication scheme is used for one predetermined component, the framework 110 plays a role of relaying between the application program 100 and the corresponding component 120. That is, when the application program 100 transmits input data to the framework 110 in a state where the framework 100 executes the corresponding component 120, the framework 110 retransmits the input data to the corresponding component 120. Thereafter, when an output of the corresponding component 120 is transmitted to the framework 110, the framework 110 transmits the received data to the application program 100. As described above, it is difficult to execute only one component in the conventional art, but it is possible to individually execute the components by adding communication functions of the framework 110 and the application program 100 in the present invention, which allows the component to be more easily developed.

A computer readable recording medium stores a program for executing the method of processing multimedia data including the steps of: (a) inquiring about a supportable communication mode of a component, by a multimedia framework between an application program and one or more components basically supporting an indirect communication mode in which the multimedia framework controls a data input/output and selectively supporting a direct communication mode in which the multimedia framework does not control the data input/output; and (b) when the component supports the direct communication mode as a result of the inquiry, constructing a media graph by selectively using the indirect communication mode or the direct communication mode. When there is a request for data transmission from the application program although the component supports the direct communication mode in step (b), the media graph is constructed using the indirect communication mode. When the indirect communication mode is used in step (b), a handler which can process data of the component is generated and registered. When a construction of the media graph using the indirect communication mode is failed in step (b), the failure is notified to the application program and then the media graph is constructed using the direct communication mode.

The method of processing multimedia data according to the present invention is not limited to the aforementioned embodiments, and various changes and modifications can be mode thereto within the technical spirit and scope defined by the appended claims.

The invention claimed is:

1. A method of processing multimedia data, the method comprising:
   inquiring each of a plurality of software components, by a multimedia framework, about a communication mode that is supported by each of the plurality of software components, the communication mode comprising an indirect communication mode, which enables the multimedia data to be transmitted between the plurality of software components under control of the multimedia framework, and a direct communication mode, which enables the multimedia data to be transmitted directly between the plurality of software components without control of the multimedia framework;
   determining, by the multimedia framework, whether an application program generates a data transmission request;
   determining, by the multimedia framework, the communication mode of each of the plurality of components;
   in response to the application program generating the data transmission request and a first component among the plurality of software components being in the indirect communication mode, constructing a media graph based on the indirect communication mode, transmitting the multimedia data from the first component to the multimedia framework, transmitting the multimedia data from the multimedia framework to the application program, and transmitting the multimedia data from the application program to a second component among the plurality of software components through the multimedia framework, the multimedia data being a single unit of multimedia data stream which continuously streams through the first component, the multimedia framework, and the application program; and
   in response to the application program not generating the data transmission request or the first component being in the direct communication mode, constructing the media graph based on the direct communication mode and transmitting the multimedia data directly from the first component to the second component.

2. The method as claimed in claim 1, wherein the constructing the media graph comprises constructing the media graph using the indirect communication mode when the application program generates data transmission request although the first component supports the direct communication mode.

3. The method as claimed in claim 2, further comprising notifying the application program of a failure in response to a construction of the media graph using the indirect communication mode being failed, and constructing the media graph using the direct communication mode in response to the failure being notified.

4. The method as claimed in claim 1, further comprising generating a handler configured to process the multimedia data of the first component in response to the media graph being constructed by the indirect communication mode.

5. A non-transitory computer readable recording medium storing a program that is executable to perform a method of processing multimedia data comprising:

inquiring each of a plurality of software components, by a multimedia framework, about a communication mode that is supported by each of the plurality of software components, the communication mode comprising an indirect communication mode, which enables the multimedia data to be transmitted between the plurality of software components under control of the multimedia framework, and a direct communication mode, which enables the multimedia data to be transmitted directly between the plurality of software components without control of the multimedia framework;

determining, by the multimedia framework, whether an application program generates a data transmission request;

determining, by the multimedia framework, the communication mode of each of the plurality of components;

in response to the application program generating the data transmission request and a first component among the plurality of software components being in the indirect communication mode, constructing a media graph based on the indirect communication mode, transmitting the multimedia data from the first component to the multimedia framework, transmitting the multimedia data from the multimedia framework to the application program, and transmitting the multimedia data from the application program to a second component among the plurality of software components through the multimedia framework, the multimedia data being a single unit of multimedia data stream which continuously streams through the first component, the multimedia framework, and the application program; and in response to the application program not generating the data transmission request or the first component being in the direct communication mode, constructing the media graph based on the direct communication mode and transmitting the multimedia data directly from the first component to the second component.

6. The non-transitory computer readable recording medium storing a program for executing the method as claimed in claim 5, the constructing the media graph comprises constructing the media graph using the indirect communication mode when the application program generates the data transmission request although the first component supports the direct communication mode.

7. The non-transitory computer readable recording medium storing a program for executing the method as claimed in claim 6, wherein the method further comprises notifying the application program of a failure in response to a construction of the media graph using the indirect communication mode being failed, and constructing the media graph using the direct communication mode in response to the failure being notified.

8. The non-transitory computer readable recording medium storing a program for executing the method as claimed in claim 5, wherein the method further comprises generating a handler configured to process the multimedia data of the first component in response to the media graph being constructed by the indirect communication mode.

* * * * *